United States Patent
Han et al.

(10) Patent No.: US 10,367,267 B2
(45) Date of Patent: *Jul. 30, 2019

(54) FLEXIBLE PRINTED CIRCUIT BOARD FOR DUAL MODE ANTENNAS, DUAL MODE ANTENNA AND USER DEVICE

(71) Applicant: LS CABLE & SYSTEM LTD., Anyang-si, Gyeonggi-do (KR)

(72) Inventors: Min Seok Han, Suwon-si (KR); Young Sun Kim, Gunpo-si (KR); Sung Han You, Seoul (KR); Lae Hyuk Park, Seoul (KR); Un Kyu Park, Hwaseong-si (KR); Ji Hyung Lee, Suwon-si (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,484

(22) Filed: Apr. 26, 2018

(65) Prior Publication Data

US 2018/0248265 A1 Aug. 30, 2018

Related U.S. Application Data

(63) Continuation of application No. 15/362,013, filed on Nov. 28, 2016, now Pat. No. 9,991,600, which is a
(Continued)

(30) Foreign Application Priority Data

May 31, 2012 (KR) .................. 10-2012-0058502

(51) Int. Cl.
*H01Q 7/06* (2006.01)
*H02J 50/70* (2016.01)
(Continued)

(52) U.S. Cl.
CPC .............. *H01Q 7/06* (2013.01); *H01Q 1/2291* (2013.01); *H01Q 1/38* (2013.01); *H01Q 7/00* (2013.01);
(Continued)

(58) Field of Classification Search
CPC .......... H01Q 7/06; H01Q 7/00; H01Q 1/2291
See application file for complete search history.

(56) References Cited

U.S. PATENT DOCUMENTS

| 5,608,417 A | 3/1997 | De Vall | |
|---|---|---|---|
| 8,922,162 B2 * | 12/2014 | Park | H02J 7/00 320/108 |

(Continued)

FOREIGN PATENT DOCUMENTS

| CN | 102157989 A | 8/2011 |
|---|---|---|
| JP | H 08149723 A | 6/1996 |

(Continued)

OTHER PUBLICATIONS

International Search Report for PCT/KR2013/003875 dated Jul. 25, 2013 from Korean Intellectual Property Office.
(Continued)

*Primary Examiner* — Hoang V Nguyen
(74) *Attorney, Agent, or Firm* — K&L Gates LLP (57) ABSTRACT

A dual mode antenna including: an insulative sheet including a main surface and an opposite main surface; a loop-shaped wireless communication coil formed on the main surface of the insulative sheet; a wireless power transmission coil formed inside the loop-shaped wireless communication coil to be electrically disconnected from the loop-shaped wireless communication coil, and formed on the main surface of the insulative sheet, a pair of wireless communication coil connection terminals electrically connected to both ends of the loop-shaped wireless communi-
(Continued)

cation coil, respectively; a pair of wireless power transmission coil connection terminals electrically connected to both ends of the wireless power transmission coil, respectively; and a ferrite sheet formed to contact the opposite main surface of the insulative sheet.

10 Claims, 5 Drawing Sheets

Related U.S. Application Data continuation of application No. 14/404,592, filed as application No. PCT/KR2013/003875 on May 3, 2013, now Pat. No. 9,543,653.

(51) Int. Cl.
  H02J 50/10    (2016.01)
  H01Q 7/00     (2006.01)
  H01Q 1/38     (2006.01)
  H04B 5/00     (2006.01)
  H02J 7/02     (2016.01)
  H01Q 1/22     (2006.01)
  H02J 5/00     (2016.01)
  H01F 27/36    (2006.01)
  H01F 38/14    (2006.01)
  H01F 27/28    (2006.01)

(52) U.S. Cl.
  CPC ............ *H02J 5/005* (2013.01); *H02J 7/025* (2013.01); *H02J 50/10* (2016.02); *H02J 50/70* (2016.02); *H04B 5/0037* (2013.01); *H04B 5/0081* (2013.01); *H01F 27/365* (2013.01); *H01F 38/14* (2013.01); *H01F 2027/2809* (2013.01)

(56) References Cited

U.S. PATENT DOCUMENTS

| | | | |
|---|---|---|---|
| 2005/0012671 A1 | 1/2005 | Bisig | |
| 2009/0108974 A1 | 4/2009 | Raggam et al. | |
| 2009/0121949 A1* | 5/2009 | Washiro | H01Q 7/00 343/702 |
| 2010/0194334 A1 | 8/2010 | Kirby et al. | |
| 2010/0213770 A1 | 8/2010 | Kikuchi | |
| 2011/0037321 A1 | 2/2011 | Chatterjee et al. | |
| 2011/0140671 A1 | 6/2011 | Kim et al. | |
| 2012/0274148 A1* | 11/2012 | Sung | H04B 5/0037 307/104 |
| 2013/0127573 A1 | 5/2013 | Nakano et al. | |

FOREIGN PATENT DOCUMENTS

| | | | | |
|---|---|---|---|---|
| JP | H 08226966 A | | 9/1996 | |
| JP | 09-171541 A | | 6/1997 | |
| JP | 2003-006589 A | | 1/2003 | |
| JP | 2004-364199 A | | 12/2004 | |
| JP | 2005-515679 A | | 5/2005 | |
| JP | 2006190181 A | * | 7/2006 | ............ G06K 17/00 |
| JP | 2009-027741 A | | 2/2009 | |
| JP | 2012-019302 A | | 1/2012 | |
| JP | 2012-065476 A | | 3/2012 | |
| JP | 5969117 B2 | | 8/2016 | |
| KR | 10-2004-0062644 A | | 7/2004 | |
| KR | 10-2006-0008332 A | | 1/2006 | |
| KR | 10-2007-0087886 A | | 8/2007 | |
| KR | 10-2011-0035196 A | | 4/2011 | |
| TW | 424550 U1 | | 3/2012 | |
| WO | WO 2011/158844 A1 | | 12/2011 | |

OTHER PUBLICATIONS

Chinese Office Action for related CN application No. 201380028978.2. dated Jul. 20, 2016 from Chinese Patent Office.
Japanese Office Action for related JP application No. 2016-134117 dated Jun. 14, 2017 from Japanese Patent Office.
Japanese Office Action for related JP application No. 2016-134118 dated Jul. 18, 2017 from Japanese Patent Office.

* cited by examiner

FLEXIBLE PRINTED CIRCUIT BOARD FOR DUAL MODE ANTENNAS, DUAL MODE ANTENNA AND USER DEVICE

CROSS REFERENCE TO PRIOR APPLICATION

This application is Continuation of U.S. patent application Ser. No. 15/362,013, filed on Nov. 28, 2016, which is a Continuation of U.S. patent application Ser. No. 14/404,592, filed on Nov. 28, 2014 and issued as U.S. Pat. No. 9,543,653 on Jan. 10, 2017, which is a National Stage Patent Application of PCT International Patent Application No. PCT/KR2013/003875, filed on May 3, 2013, which claims priority to Korean Patent Application No. 10-2012-0058502, filed on May 31, 2012, which are all hereby incorporated by reference in their entirety.

BACKGROUND

The present invention relates to a flexible printed circuit board for dual mode antennas to perform near field communication (NFC) and wireless power transmission, a dual mode antenna and a user device using the same.

Recently, an energy-information technology (IT) fusion technology has increasingly attracted considerable attention. The energy-IT fusion technology is a technology of fusing a fast developing IT technology into the conventional energy technology. An example of the energy-IT fusion technology is a wireless power transfer (WPT) technology. Wireless power transfer is a technology of supplying power to electric instruments in a wireless fashion instead of using the conventional power cable. The wireless power transfer technology has an advantage in that an electric home appliance can be charged in a wireless fashion without connection between the electric instrument and an electric outlet or a charging device via a power cable. For this reason, research has been actively conducted on the wireless power transfer technology.

Examples of the wireless power transfer technology which have been commercialized or are under research include a magnetic induction type wireless power transfer technology and a magnetic resonance type wireless power transfer technology. The magnetic induction type wireless power transfer technology uses a magnetic induction phenomenon between two coils. In the magnetic induction type wireless power transfer technology, it is possible to transmit power of several W within a distance of several mm to several cm. The magnetic induction type wireless power transfer technology has been applied to a traffic card, a wireless shaver, an electric tooth brush, etc.

On the other hand, the magnetic resonance type wireless power transfer technology is a technology of transferring power based on resonant coupling at a resonant frequency. In the magnetic resonance type wireless power transfer technology, it is possible to transmit power of several tens of W within a distance of several m. Transfer efficiency is affected by a quality factor (Q) value of a resonator.

Meanwhile, many mobile devices which have been recently placed on the market include a near field communication (NFC) module for NFC communication. NFC is a communication technology of transmitting and receiving data within a distance of approximately 10 cm using a band frequency of 13.56 MHz. The NFC module is mounted in a mobile device. The NFC module is used in various applications, such as user authentication, identification cards, credit cards, mobile tickets, and mobile coupons.

Meanwhile, an NFC antenna (coil) is necessary for NFC communication. The NFC antenna includes an NFC reader antenna and an NFC tag antenna, which are separately provided. In a case in which the NFC antenna is realized in a real mobile device, an integration type dual antenna structure, in which the NFC reader antenna and the NFC tag antenna are integrated to have a stacked structure, is used.

Also, an additional wireless power transmission antenna (coil) is necessary for wireless power transmission. In order to simultaneously support an NFC communication function and a wireless power transmission function in a mobile device, therefore, it is necessary to mount antennas together corresponding to the respective functions in the mobile device. In this case, an antenna installation space is limited depending upon the size of the mobile device. That is, the antenna installation space is very small and narrow. Also, the size and thickness of the mobile device are increased due to such two kinds of antennas.

For this reason, there is a high necessity for a technology that is capable of minimizing a necessary antenna installation space although both the NFC antenna and the wireless power transmission antenna are mounted in the mobile device. In connection with this matter, U.S. Patent Application Publication No. US 2010-0194334 discloses an invention entitled "RETROFITTING WIRELESS POWER AND NEAR FIELD COMMUNICATION IN ELECTRONIC DEVICES". The invention disclosed in U.S. Patent Application Publication No. US 2010-0194334 relates to a power circuit for wireless power transmission and near field communication. An electronic device having the power circuit includes a back housing having a wireless power receiving antenna and a conversion circuit. U.S. Patent Application Publication No. US 2010-0194334 discloses that the wireless power receiving antenna may be used to perform a wireless power transmission function and an NFC communication function. However, detailed constructions to simultaneously perform the wireless power transmission function and the NFC communication function are not disclosed.

SUMMARY

Therefore, the present invention has been made in view of the above problems, and it is an object of the present invention to provide a flexible printed circuit board for dual mode antennas to simultaneously support near field communication (NFC) and wireless power transmission, a dual mode antenna and a user device having the same mounted therein.

It is another object of the present invention to provide a flexible printed circuit board for dual mode antennas in which an NFC antenna and a wireless power transmission antenna are disposed in a non-overlapping fashion to restrain lowering of communication performance due to mutual interference therebetween, a dual mode antenna and a user device having the same mounted therein.

It should be noted that objects of the present invention are not limited to the objects of the present invention as mentioned above, and other unmentioned objects of the present invention will be clearly understood from the following description.

In accordance with an aspect of the present invention, the above and other objects can be accomplished by the provision of a flexible printed circuit board for dual mode antennas comprising a first loop-shaped coil formed at one main surface of an insulative sheet and a second loop-shaped coil formed inside the loop of the first coil.

The second coil may be formed at opposite main surfaces of the insulative sheet to have a stacked structure.

The first coil and the second coil may be a near field communication (NFC) loop antenna and a wireless power transmission coil, respectively.

The flexible printed circuit board may further comprising a pair of first connection terminals connected to both ends of the first coil to contact a pair of first external circuit terminals in an electrically connected state and a pair of second connection terminals connected to both ends of the second coil to contact a pair of second external circuit terminals in an electrically connected state.

The first connection terminals and the second connection terminals may be connected to an external NFC module and an external wireless power transmission module, respectively.

One of the first connection terminals may be connected to one end of the first coil through a stitching via, and the stitching via may comprise a first via extending through the insulative sheet, the first via having one end connected to one of the first connection terminals, a second via extending through the insulative sheet, the second via having one end connected to one end of the first coil and a connection pattern formed at the other main surface of the insulative sheet, the connection pattern having one end connected to the other end of the first via and the other end connected to the other end of the second via.

One of the first connection terminals may be connected to one end of the first coil through a jumper line.

The jumper line may be formed between a ferrite sheet formed to contact one main surface of the insulative sheet and the first coil.

The flexible printed circuit board may further comprising a ferrite sheet formed to contact one main surface of the insulative sheet.

The ferrite sheet may comprise a first ferrite sheet formed at a position opposite to the first coil of the insulative sheet in a contact fashion and a second ferrite sheet formed at a position opposite to the second coil of the insulative sheet in a contact fashion.

The flexible printed circuit board may further comprising a step adjustment slit formed between the first coil and the second coil to adjust a step between the first ferrite sheet and the second ferrite sheet.

The flexible printed circuit board may further comprising a pair of extension patterns having one ends connected to the second connection terminals and the other ends connected to the second coil.

The second coil may comprise a first loop having one end connected to one of the extension patterns, the first loop being formed at the other main surface of the insulative sheet so that the first loop is turned a plurality of times in a first direction and a second loop having one end connected to the other of the extension patterns, the second loop being formed at one main surface of the insulative sheet so that the second loop is turned a plurality of times in a direction to reinforce current flowing in the first loop, the first loop and the second loop being formed to have a stacked structure.

The second coil may further comprises a third via extending through the insulative sheet to connect the other end of the first loop and the other end of the second loop.

The second coil may further comprises a fourth via extending through the insulative sheet to connect one end of the second loop and the other of the extension patterns.

And in accordance with an aspect of the present invention, the above and other objects can be accomplished by the provision of a dual mode antenna comprising a loop-shaped NFC coil formed at one main surface of a printed circuit board, a loop-shaped wireless power transmission coil formed on the printed circuit board, a pair of NFC connection terminals connected to both ends of the NFC coil and electrically connected to an NFC module and a pair of W/C connection terminals connected to both ends of the wireless power transmission coil and electrically connected to a wireless power transmission module, wherein the wireless power transmission coil is formed at opposite main surfaces of the printed circuit board to have a stacked structure.

The wireless power transmission coil may be formed inside the loop of the NFC coil.

The printed circuit board may be a flexible printed circuit board (FPCB).

One of the NFC connection terminals may be connected to one end of the NFC coil through a stitching via, and the stitching via may comprise a first via extending through the printed circuit board, the first via having one end connected to one of the NFC connection terminals, a second via extending through the printed circuit board, the second via having one end connected to one end of the NFC coil and a connection pattern formed at the other main surface of the printed circuit board, the connection pattern having one end connected to the other end of the first via and the other end connected to the other end of the second via.

One of the NFC connection terminals may be connected to one end of the NFC coil through a jumper line.

The jumper line may be formed between a ferrite sheet formed to contact one main surface of the printed circuit board and the NFC coil.

The dual mode antenna may further comprising a ferrite sheet formed to contact one main surface of the printed circuit board.

The ferrite sheet may comprise an NFC coil side ferrite sheet formed at a position opposite to the NFC coil of the printed circuit board in a contact fashion and a wireless power transmission coil side ferrite sheet formed at a position opposite to the wireless power transmission coil of the printed circuit board in a contact fashion.

The dual mode antenna may further comprising a step adjustment slit formed between the NFC coil and the wireless power transmission coil to adjust a step between the NFC coil side ferrite sheet and the wireless power transmission coil side ferrite sheet.

The dual mode antenna may further comprising a pair of extension patterns having one ends connected to the W/C connection terminals and the other ends connected to the wireless power transmission coil.

The wireless power transmission coil may comprise an upper loop having one end connected to one of the extension patterns, the upper loop being formed at the other main surface of the printed circuit board so that the upper loop is turned a plurality of times in a first direction and a lower loop having one end connected to the other of the extension patterns, the lower loop being formed at one main surface of the printed circuit board so that the lower loop is turned a plurality of times in a direction to reinforce current flowing in the upper loop, the upper loop and the lower loop being formed to have a stacked structure.

The wireless power transmission coil may further comprises a third via extending through the printed circuit board to connect the other end of the upper loop and the other end of the lower loop.

The wireless power transmission coil may further comprises a fourth via extending through the printed circuit board to connect one end of the lower loop and the other of the extension patterns.

And in accordance with an aspect of the present invention, the above and other objects can be accomplished by the provision of a user device with an NFC communication function and a wireless power transmission function comprising a dual mode antenna comprising an NFC coil and a wireless power transmission coil, an NFC module to perform NFC communication using the NFC coil and a wireless power transmission module to wirelessly transmit power using the wireless power transmission coil, wherein the NFC coil of the dual mode antenna is formed at one main surface of an insulative sheet, the wireless power transmission coil of the dual mode antenna is formed inside the NFC coil, and the wireless power transmission coil is formed at opposite main surfaces of the insulative sheet to have a stacked structure.

The dual mode antenna may further comprises a pair of NFC connection terminals connected to both ends of the NFC coil and electrically connected to the NFC module and a pair of W/C connection terminals connected to both ends of the wireless power transmission coil and electrically connected to the wireless power transmission module.

One of the NFC connection terminals may be connected to one end of the NFC coil through a stitching via, and the stitching via may comprise a first via extending through the insulative sheet, the first via having one end connected to one of the NFC connection terminals, a second via extending through the insulative sheet, the second via having one end connected to one end of the NFC coil and a connection pattern formed at the other main surface of the insulative sheet, the connection pattern having one end connected to the other end of the first via and the other end connected to the other end of the second via.

One of the NFC connection terminals may be connected to one end of the NFC coil through a jumper line.

The jumper line may be formed between a ferrite sheet formed to contact one main surface of the insulative sheet and the NFC coil.

The user device may further comprising a pair of extension patterns having one ends connected to the W/C connection terminals and the other ends connected to the wireless power transmission coil.

The wireless power transmission coil may comprise an upper loop having one end connected to one of the extension patterns, the upper loop being formed at the other main surface of the insulative sheet so that the upper loop is turned a plurality of times in a first direction and a lower loop having one end connected to the other of the extension patterns, the lower loop being formed at one main surface of the insulative sheet so that the lower loop is turned a plurality of times in a direction to reinforce current flowing in the upper loop, the upper loop and the lower loop being formed to have a stacked structure.

The wireless power transmission coil may further comprises a third via extending through the insulative sheet to connect the other end of the upper loop and the other end of the lower loop.

The wireless power transmission coil may further comprises a fourth via extending through the insulative sheet to connect one end of the lower loop and the other of the extension patterns.

And in accordance with an aspect of the present invention, the above and other objects can be accomplished by the provision of a flexible printed circuit board for dual mode antennas comprising a loop-shaped NFC coil formed at one main surface of an insulative sheet, a loop-shaped wireless power transmission coil formed on the insulative sheet, a pair of NFC connection terminals connected to both ends of the NFC coil and electrically connected to an external NFC module, a pair of W/C connection terminals connected to both ends of the wireless power transmission coil and electrically connected to an external wireless power transmission module, an NFC connection terminal connecting line having one end connected to one end of the NFC coil and the other end connected to one of the NFC connection terminals and a pair of W/C connection terminal connecting lines having one ends connected to the W/C connection terminals and the other ends connected to the wireless power transmission coil.

The NFC connection terminal connecting line may comprise a jumper line or a stitching via.

The stitching via may comprise a first via extending through the insulative sheet, the first via having one end connected to one of the NFC connection terminals, a second via extending through the insulative sheet, the second via having one end connected to one end of the NFC coil and a connection pattern formed at the other main surface of the insulative sheet, the connection pattern having one end connected to the other end of the first via and the other end connected to the other end of the second via.

The jumper line may be formed between a ferrite sheet formed to contact one main surface of the insulative sheet and the NFC coil.

The wireless power transmission coil may be formed inside the loop of the NFC coil.

The wireless power transmission coil may be formed at opposite main surfaces of the insulative sheet to have a stacked structure.

The wireless power transmission coil may comprise a first loop having one end connected to one of the W/C connection terminal connecting lines, the first loop being formed at one main surface of the insulative sheet so that the first loop is turned a plurality of times in a first direction and a second loop having one end connected to the other of the W/C connection terminal connecting lines, the second loop being formed at the other main surface of the insulative sheet so that the second loop is turned a plurality of times in a direction to reinforce current flowing in the first loop, the first loop and the second loop being formed to have a stacked structure.

And in accordance with an aspect of the present invention, the above and other objects can be accomplished by the provision of a dual mode antenna comprising a loop-shaped NFC coil formed on a first insulative sheet, a wireless power transmission coil formed inside the loop of the NFC coil, an extension line to connect the wireless power transmission coil to an external W/C module, a pair of NFC connection terminals connected to both ends of the NFC coil and electrically connected to an external NFC module and a pair of W/C connection terminals connected to both ends of the wireless power transmission coil and electrically connected to an external wireless power transmission module.

The wireless power transmission coil may be formed of a real coil.

The dual mode antenna may further comprising an extension line slot formed inside the loop of the NFC coil so that the extension line slot extends through the first insulative sheet, wherein the extension line is inserted through the extension line slot so that the extension line is coupled to the wireless power transmission coil inside the loop of the NFC coil.

The extension line and the W/C connection terminals may be formed on a second insulative sheet.

The wireless power transmission coil may be formed at opposite main surfaces of a third insulative sheet to have a stacked structure.

The dual mode antenna may further comprising a jumper line or a stitching via to connect one of the NFC connection terminals to the NFC coil.

In accordance with an aspect of the present invention, an antenna installation space is efficiently disposed in a user device, and therefore, it is possible to simultaneously support near field communication (NFC) and wireless power transmission.

Also, the NFC antenna and the wireless power transmission antenna are disposed in the user device so that the NFC antenna and the wireless power transmission antenna do not overlap, and therefore, it is possible to restrain lowering of communication performance due to mutual interference therebetween.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention may be modified in various ways and provide various embodiments. The present invention will be described below through a detailed description of specific embodiments illustrated in the accompanying drawings. The detailed description is not intended to limit the present invention and it should be understood that the present invention includes all changes, equivalents, or substitutions within the spirit and scope of the present invention.

In the following description of the present disclosure, a detailed description of known related technologies will be omitted when it may obscure the subject matter of the present disclosure. Numbers or ordinal numbers (for example, first and second) that are used in the description of this specification are merely reference symbols for discriminating between components.

When it is stated that one component is "connected" or "coupled" to another component, it is to be understood that the two components may not only be directly "connected" or "coupled" but may also be indirectly "connected" or "coupled" via another component unless specifically stated otherwise.

A user device is an electronic instrument that receives external power. The user device supports a near field communication (NFC), which is one of the means for communication with other user devices. For example, the user device may be a mobile device, such as a mobile phone, a smart phone, a laptop computer, a digital broadcasting terminal, a personal digital assistant (PDA), a portable multimedia player (PMP), or a navigator. Also, the user device may include other electronic equipments, such as a television (TV), an electronic picture frame, and a refrigerator, that perform communication with external devices.

Now, exemplary embodiments of the present invention will be described in detail with reference to the accompanying drawings.

Figure 1:
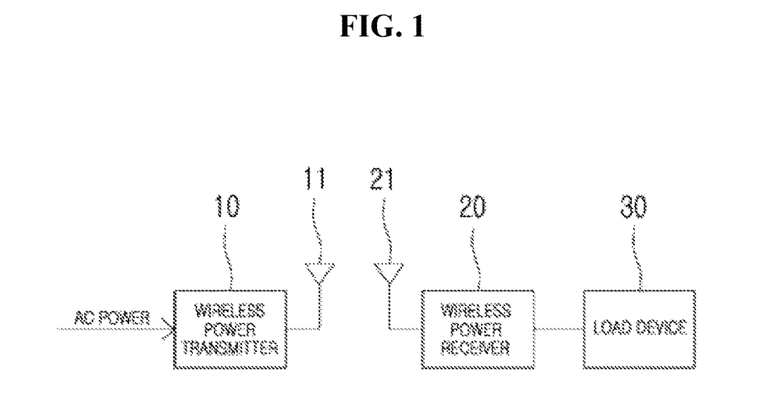
FIG. 1 is a view showing the overall outline of a wireless power transmission system.

FIG. 1 is a view showing the overall outline of a wireless power transmission system.

As shown in FIG. 1, the wireless power transmission system includes a wireless power transmission device (or a wireless power transmitter) 10 to transmit power in a wireless fashion and a wireless power receiving device (or a wireless power receiver) 20 to transmit power in the wireless fashion.

Power is wirelessly transmitted from the wireless power transmission device 10 to the wireless power receiving device 20 in a magnetic induction mode.

The wireless power transmission device 10 outputs an electromagnetic field to the outside using a power transmission antenna 11 for power transmission. To this, the wireless power transmission device 10 receives alternating current (AC) power from the outside.

The wireless power transmission device 10 rectifies AC power supplied from an external input power supply into direct current (DC) power using an AC/DC converter (not shown), converts high-frequency AC power through a DC/AC conversion circuit (not shown) for wireless power transmission, and transmits the high-frequency AC power to the wireless power receiving device 20 through the power transmission antenna 11.

The wireless power receiving device 20 may receive a power signal transmitted from the wireless power transmission device 10 using a power receiving antenna 21. Specifically, a magnetic field is generated around the power transmission antenna 11 due to current flowing in the power transmission antenna 11 of the wireless power transmission device 10, and voltage is induced in the power receiving antenna 21 of the wireless power receiving device 20 disposed adjacent to the magnetic field due to electromagnetic induction. As a result, power is transmitted from the wireless power transmission device 10 to the wireless power receiving device 20.

The wireless power receiving device 20 may charge a load device 30 using the received power. Alternatively, the received power may be used as driving power necessary to drive the wireless power receiving device 20.

Hereinafter, the detailed construction of a user device with a dual mode antenna according to an embodiment of the present invention will be described in detail.

Figure 2:
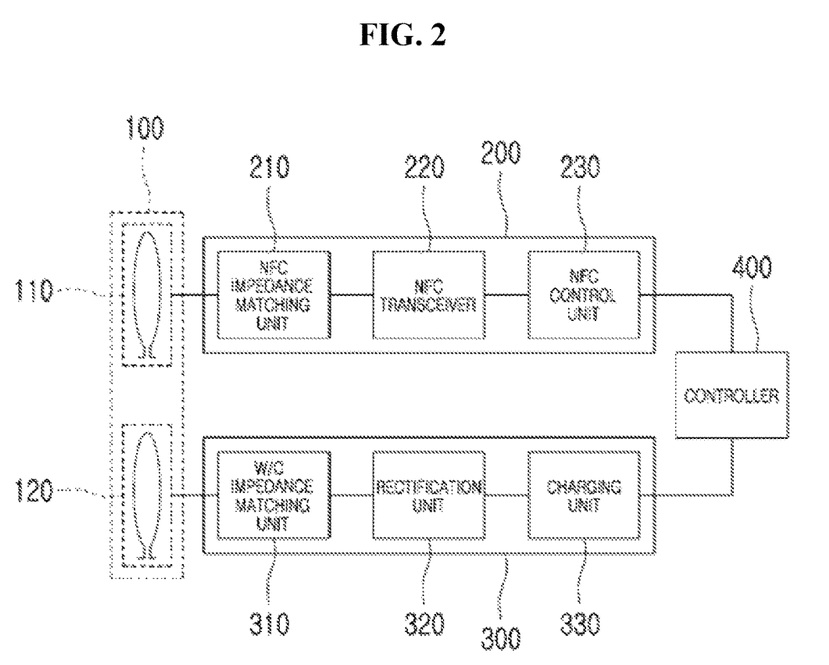
FIG. 2 is a view illustrating the detailed construction of a user device according to an embodiment of the present invention.

FIG. 2 is a block diagram illustrating the detailed construction of a user device according to an embodiment of the present invention.

As shown in FIG. 2, the user device includes a near field communication (NFC) module 200 to perform an NFC communication function and a wireless power transmission module 300 to perform a wireless power transmission function. Also, the user device further includes a dual mode antenna 100 including an NFC coil 110 electrically connected to the NFC module 200 and a wireless power transmission coil 120 electrically connected to the wireless power transmission module 300.

The dual mode antenna 100 may be formed in a dual loop shape in which the NFC coil 110 and the wireless power transmission coil 120 are spaced apart from each other by a predetermined distance. The dual mode antenna 100 may be formed to have a structure in which patterns corresponding to the NFC coil 110 and the wireless power transmission coil 120 are formed on an insulative sheet. For example, the dual mode antenna 100 may be realized by a flexible printed circuit board (FPCB). The NFC coil 110 and the wireless power transmission coil 120 are electrically isolated from each other. Also, in the dual loop shape constituted by the NFC coil 110 and the wireless power transmission coil 120, the distance between the NFC coil 110 and the wireless power transmission coil 120 may be adjusted to adjust impedance matching between the coils.

The NFC module 200 controls the NFC coil 110 to perform NFC communication on the user device. Specifically, the NFC module 200 includes an NFC impedance matching unit 210, an NFC transceiver 220, and an NFC control unit 230.

When an NFC communication function is requested by a user or the operation of an application in the user device, a controller 400 of the user device controls the NFC module 200 to perform the NFC communication function.

The NFC impedance matching unit 210 may be installed between the NFC coil 110 and the NFC transceiver 220 to match impedance between the NFC coil 110 and the NFC transceiver 220.

The NFC transceiver 220 may include a base band processing unit, a communication protocol processing circuit, a register file, and a universal asynchronous receiver/transmitter (UART) serial interface. The above elements of the NFC transceiver 220 are well known in the art to which the present invention pertains, and therefore, a description thereof will be omitted.

The NFC control unit 230 is connected to the NFC transceiver 220 to control overall operation of the NFC transceiver 220. Also, the NFC control unit 230 may perform communication with an external host through an additional communication interface.

The wireless power transmission module 300 may include a wireless power transmission (W/C) impedance matching unit 310, a rectification unit 320, and a charging unit 330.

The W/C impedance matching unit 310 may be disposed between the wireless power transmission coil 120 and the rectification unit 320 to match impedance between the wireless power transmission coil 120 and the rectification unit 320.

The rectification unit 320 rectifies a power signal input through the wireless power transmission coil 120 into a DC power through half wave rectification. A high-frequency noise component may be removed from the DC power rectified by the rectification unit 320 by a filtering unit (not shown). Subsequently, the DC power may be converted into voltage necessary to drive devices.

The charging unit 330 charges an external load device or an internal battery using the power converted into necessary voltage.

Hereinafter, the detailed construction of a dual mode antenna 100 according to an embodiment of the present invention will be described in detail.

Figure 3:
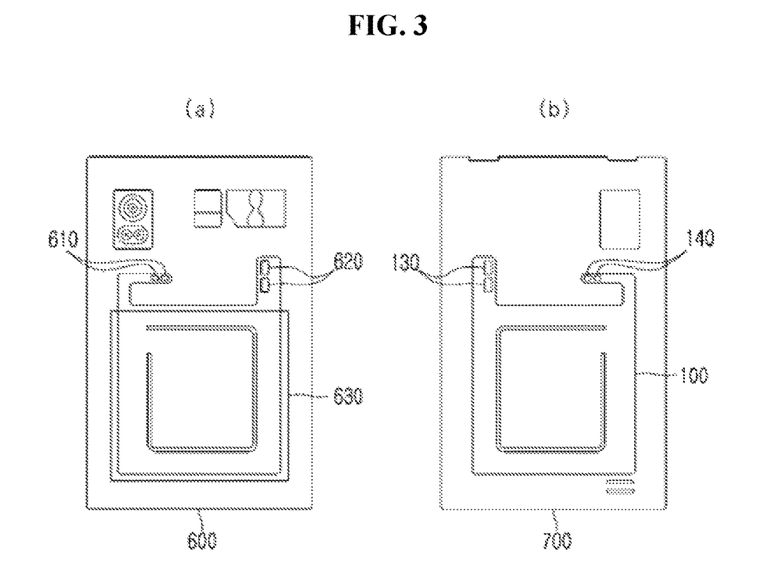
FIG. 3 is a rear view of a main body of the user device and an exploded view of a rear cover of the user device illustrating a case in which a dual mode antenna according to an embodiment of the present invention is mounted to the rear cover of the user device.

FIG. 3 is a rear view of a main body of the user device and an exploded view of a rear cover of the user device illustrating a case in which a dual mode antenna according to an embodiment of the present invention is mounted to the rear cover of the user device.

As shown in FIG. 3, the dual mode antenna 100 may be mounted to a battery cover 700 of the user device. The dual mode antenna 100 may be attached to the inside of the battery cover 700 facing a main body 600 of the user device or integrally coupled to the inside of the battery cover 700. In a case in which the dual mode antenna 100 is integrally coupled to the inside of the battery cover 700, openings may be formed in the battery cover 700 so that NFC coil connection terminals 130 and W/C coil connection terminals 140 of the dual mode antenna 100 are exposed to the outside through the openings of the battery cover 700. In this embodiment, two NFC coil connection terminals 130 may form a pair. In the same manner, two W/C coil connection terminals 140 may form a pair.

At the rear of the main body of the user device may be formed NFC module connection terminals 620 and W/C module connection terminals 610 corresponding to the NFC coil connection terminals 130 and the W/C coil connection terminals 140 of the dual mode antenna 100, respectively. When the battery cover 700 is coupled to the main body 600 of the user device, therefore, the NFC coil connection terminals 130 and the W/C coil connection terminals 140 may contact the NFC module connection terminals 620 and the W/C module connection terminals 610 so that the NFC coil connection terminals 130 and the W/C coil connection terminals 140 are electrically connected to the NFC module connection terminals 620 and the W/C module connection terminals 610. The NFC module connection terminals 620 or the W/C module connection terminals 610 may be formed in a C-clip shape so that connection between the NFC module connection terminals 620 or the W/C module connection terminals 610 and the NFC coil connection terminals 130 or the W/C coil connection terminals 140 is maintained by elasticity of the C-clip shape.

Hereinafter, the shape of the dual mode antenna 100 according to the embodiment of the present invention will be described in detail.

Figure 4:
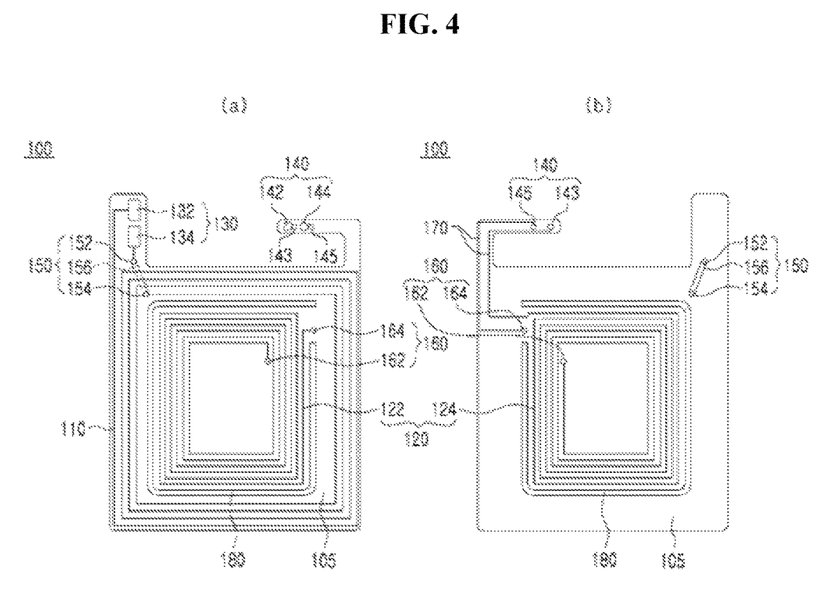
FIG. 4 is a front view and a rear view of the dual mode antenna according to the embodiment of the present invention.

FIG. 4 is a front view and a rear view of the dual mode antenna 100 according to the embodiment of the present invention.

Referring to FIG. 4, the dual mode antenna 100 is manufactured by forming an NFC pattern on an insulative sheet 105, such as a FPCB. A pair of NFC coil connection terminals 130 and a pair of W/C coil connection terminals 140 may be formed at the front of the insulative sheet 105.

The NFC coil connection terminals 130 may be connected to the NFC coil 110 to transmit a signal input through the NFC module connection terminals 620 to the outside or to transmit an NFC signal received from the outside to the NFC module 200.

The NFC coil 110 may be formed at the front of the insulative sheet 105. The NFC coil 110 is formed along the edge of the insulative sheet 105 as widely as possible to maximize the diameter of the loop and to reduce the turn number of windings constituting the loop and capacitance between the windings.

One end of the NFC coil 110 is connected to one 132 of the NFC coil connection terminals. The pattern of the NFC coil 110 is turned inside to form a loop. In the loop, the other end of the NFC coil 110 is connected to the other 134 of the NFC coil connection terminals outside the loop through a stitching via 150.

The stitching via 150 may include two vias 152 and 154 extending through the insulative sheet 105 and a connection pattern 156 connected between the two vias 152 and 154 to form a signal connection path. The connection pattern 156 may be formed at the rear of the insulative sheet 105.

The W/C coil connection terminals 140 may be connected to the wireless power transmission coil 120 to transmit or receive a power signal input through the W/C module connection terminals 610.

The wireless power transmission coil 120 may be formed inside the loop formed by the NFC coil 110. In this case, the diameter of the wireless power transmission coil 120 is less than that of the NFC coil 110. In order to secure a necessary number of windings, therefore, the wireless power transmission coil 120 may be formed at the front and rear of the insulative sheet 105 to have a stacked structure.

The wireless power transmission coil 122 formed at the front of the insulative sheet 105 is formed in a loop shape convergent inside. The wireless power transmission coil 122 is connected to the wireless power transmission coil 124 formed at the rear of the insulative sheet 105 through a via hole 162 of the insulative sheet 105.

The wireless power transmission coil 122 formed at the front of the insulative sheet 105 and the wireless power transmission coil 124 formed at the rear of the insulative sheet 105 are turned in the same direction to form loops when viewed at the front of the insulative sheet 105. Consequently, current flowing in the wireless power transmission coil 120 is boosted.

The W/C coil connection terminals 142 and 144 are respectively connected to the wireless power transmission coil 122 and 124 through a pair of extension patterns 170. The shape of the extension patterns 170 may be changed based on the disposition of the W/C coil connection terminals 140. Consequently, flexibility in designing the internal circuits of the user device is secured.

Also, the extension patterns 170 are formed at the rear of the insulative sheet 105. The W/C coil connection terminals 142 and 144 may be connected to one side of the extension patterns 170 formed at the rear of the insulative sheet 105 through a pair of via holes 143 and 145 of the insulative sheet 105.

The other side of the extension patterns 170 is connected to the wireless power transmission coil 120. One of the extension patterns 170 is connected to one end of the wireless power transmission coil 122 formed at the front of the insulative sheet 105 through the via hole 162. The other of the extension patterns 170 is connected to the other end of the wireless power transmission coil 124 formed at the rear of the insulative sheet 105.

Since the wireless power transmission coil 120 is connected to the W/C coil connection terminals 140 through the via holes 162, 164, 143, and 145 and the extension patterns 170 formed at the rear of the insulative sheet 105 as described above, overlap between the wireless power transmission coil 120 and the NFC coil 110 is prevented, thereby preventing lowering of performance due to mutual interference therebetween.

Figure 6:
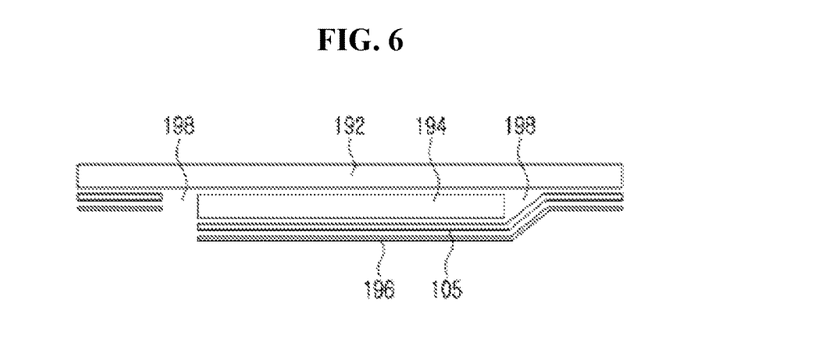
FIG. 6 is a side view illustrating the structure of the dual mode antenna according to the embodiment of the present invention.

Meanwhile, a step adjustment slit may be formed between the NFC coil 110 and the wireless power transmission coil 120. Referring to FIG. 6, a W/C coil side ferrite sheet 194 and an NFC coil side ferrite sheet 192 may be sequentially attached to the front of the insulative sheet 105. For reference, the ferrite sheets prevent magnetic flux from being blocked due to eddy current.

In this case, the size of the inside W/C coil side ferrite sheet 194 is less than that of the outside NFC coil side ferrite sheet 192. Consequently, the thickness of a portion at which the W/C coil side ferrite sheet 194 and the NFC coil side ferrite sheet 192 overlap is greater than that of a portion at which only the NFC coil side ferrite sheet 192 is disposed.

For this reason, a step adjustment slit 198 to adjust a step caused due to the thickness difference between the ferrite sheets may be formed between the NFC coil 110 and the wireless power transmission coil 120, thereby preventing damage to the wireless power transmission coil 120 or the extension patterns 170 due to the thickness difference between the ferrite sheets.

Figure 5:
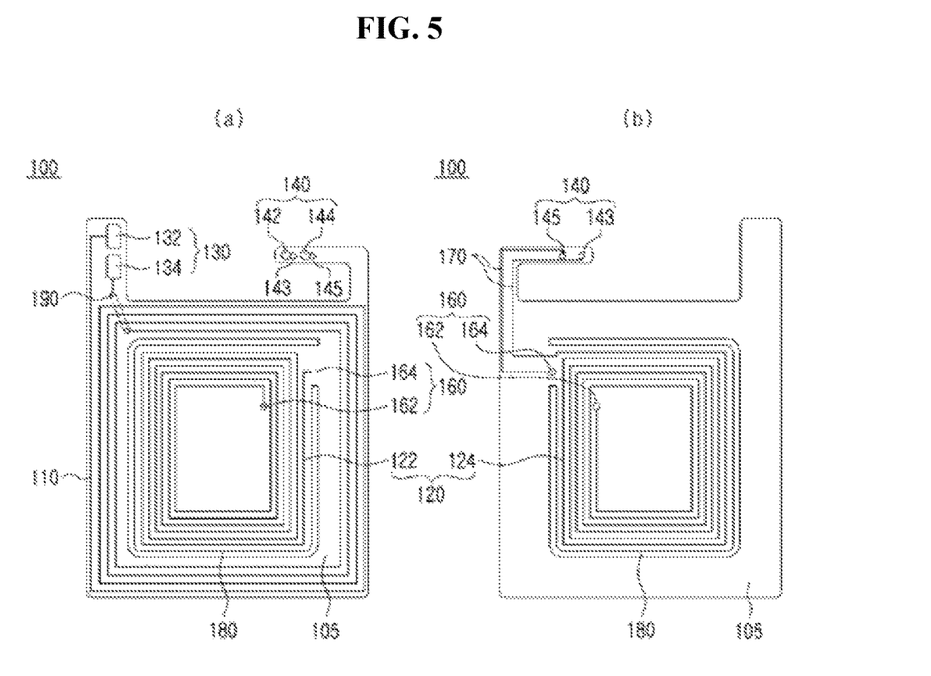
FIG. 5 is a front view and a rear view of a dual mode antenna according to another embodiment of the present invention.

FIG. 5 is a front view and a rear view of a dual mode antenna according to another embodiment of the present invention.

As shown in FIG. 5, the dual mode antenna 100 according to this embodiment of the present invention may be configured such that an NFC coil 110 is formed on an insulative sheet 105, and a wireless power transmission coil 120 is formed inside a loop formed by the NFC coil 110 in the same manner as in the dual mode antenna 100 of FIG. 4. The NFC coil 110 and the wireless power transmission coil 120 are connected to NFC coil connection terminals 130 and W/C coil connection terminals 140, respectively.

One end of the NFC coil 110 may be connected to one 132 of the NFC coil connection terminals. A pattern of the NFC coil 110 may be turned inside to form a loop. In the loop, the other end of the NFC coil 110 may be connected to the other 134 of the NFC coil connection terminals outside the loop through a jumper line 190.

In this case, the jumper line 190 is formed on the NFC coil 110 formed at the front of the insulative sheet 105, and therefore, the rear of the insulative sheet 105 at which an NFC signal is input or output is not blocked by the jumper line 190 as shown in FIG. 6, thereby restraining interference with the NFC coil 110.

Hereinafter, the detailed construction of a dual mode antenna according to a further embodiment of the present invention will be described in detail.

Figure 7:
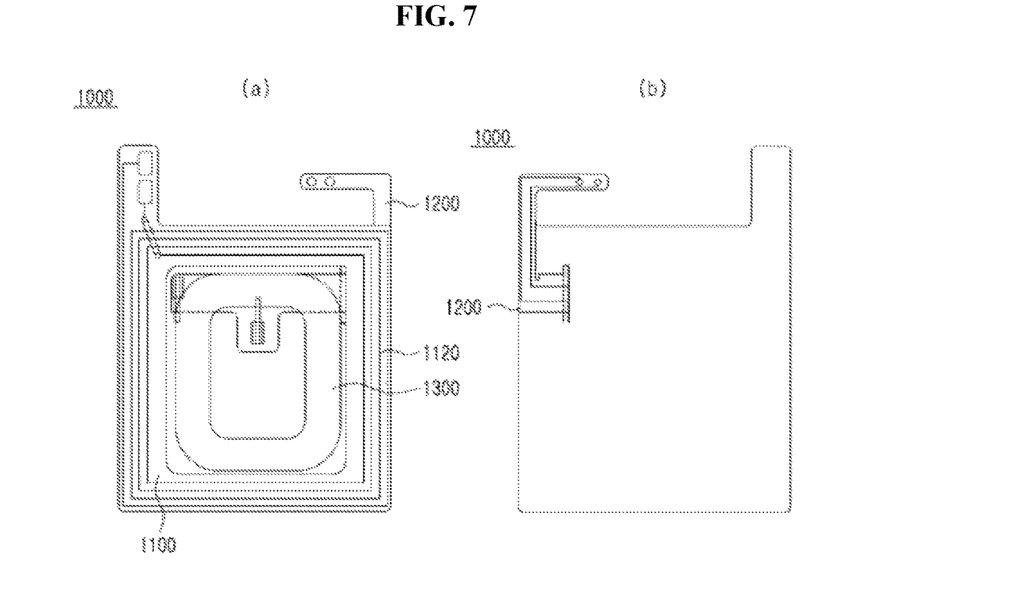
FIG. 7 is a front view and a rear view of a dual mode antenna according to a further embodiment of the present invention.

FIG. 7 is a front view and a rear view showing the detailed construction of a dual mode antenna 1000 according to a further embodiment of the present invention.

Referring to FIG. 7, the dual mode antenna 1000 includes an NFC antenna unit 1100 having an NFC coil, a wireless power transmission coil 1300, and an extension line unit 1200 to connect the wireless power transmission coil 1300 to an external wireless power transmission module. The NFC antenna unit 1100, the wireless power transmission coil 1300, and the extension line unit 1200 may be formed on different insulative sheets.

The wireless power transmission coil 1300 may be disposed inside a loop formed by an NFC coil 1120 of the NFC antenna unit 1100. In this case, the wireless power transmission coil 1300 located inside the loop may be connected to the outside of the NFC coil 1120 through the extension line unit 1200.

Meanwhile, a ferrite sheet may be bonded to the dual mode antenna 1000. The ferrite sheet may include an NFC coil side ferrite sheet bonded at a position opposite to the NFC antenna unit 1100 and a wireless power transmission coil side ferrite sheet bonded at a position opposite to the wireless power transmission coil 1300.

Figure 8:
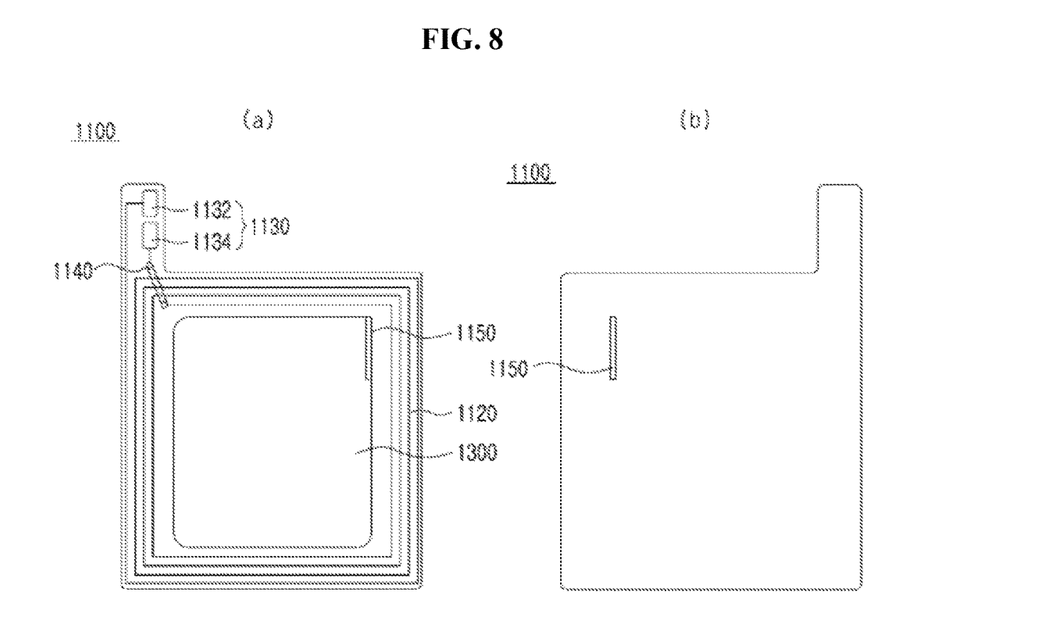
FIG. 8 is a front view and a rear view showing the detailed construction of a near field communication (NFC) antenna unit constituting the dual mode antenna of FIG. 7.

The detailed construction of the NFC antenna unit 1100 will hereinafter be described in detail with reference to FIG. 8. The NFC antenna unit 1100 includes a first insulative sheet 1110, a pair of NFC connection terminals 1130 formed at the front of the first insulative sheet 1110 and connected to an external NFC module, and an NFC coil 1120 formed at the front of the first insulative sheet 1110 in a loop shape and connected to the NFC connection terminals 1130.

One end of the NFC coil 1120 may be connected to a corresponding one of the NFC connection terminals 1130 through an NFC connection terminal connecting line 1140. In this case, the NFC connection terminal connecting line 1140 may be realized by a jumper line or a stitching via extending through the first insulative sheet 1110.

Also, an extension line slot 1150 may be formed in the NFC antenna unit 1100 inside the loop of the NFC coil 1120. The extension line unit 1200 may be connected to the wireless power transmission coil 1300 inside the loop through the extension line slot 1150.

The extension line unit 1200 is disposed between the front of the NFC antenna unit 1100 and the ferrite sheet, and therefore, interference with the NFC coil 1120 due to the extension line is reduced.

Figure 9:
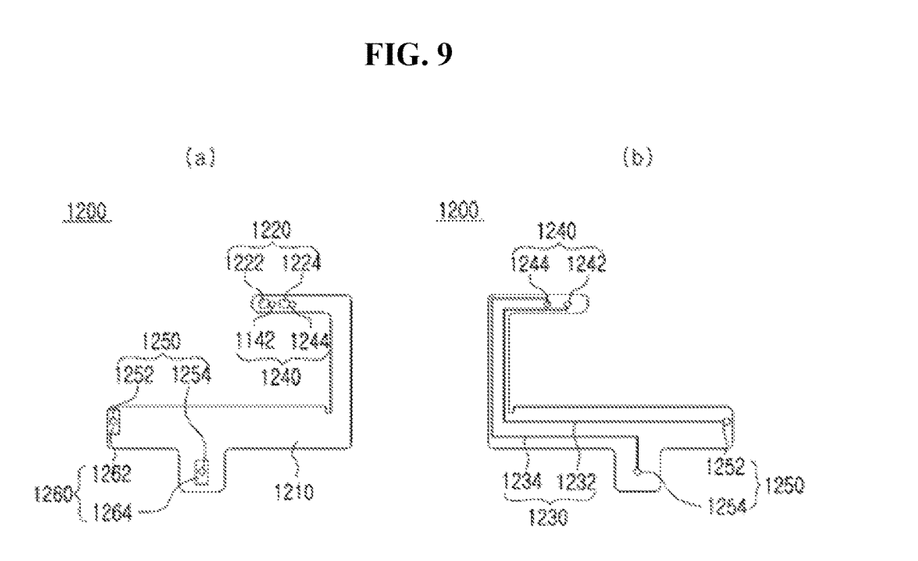
FIG. 9 is a front view and a rear view showing the detailed construction of an extension line unit constituting the dual mode antenna of FIG. 7.

The detailed construction of the extension line unit 1200 will hereinafter be described in detail with reference to FIG. 9. The extension line unit 1200 includes a second insulative sheet 1210 different from the first insulative sheet 1110, a pair of W/C connection terminals 1220 formed at the front of the second insulative sheet 1210 and connected to the wireless power transmission module, a pair of W/C extension lines 1230 formed at the rear of the second insulative sheet 1210, and a pair of joining units 1260 to connect the W/C extension lines 1230 to the wireless power transmission coil 1300.

The W/C extension lines 1230 may be connected to the W/C connection terminals 1220 through a pair of via holes 1240. Also, the W/C extension lines 1230 may be connected to the joining units 1260 through another pair of via holes 1250.

Figure 10:
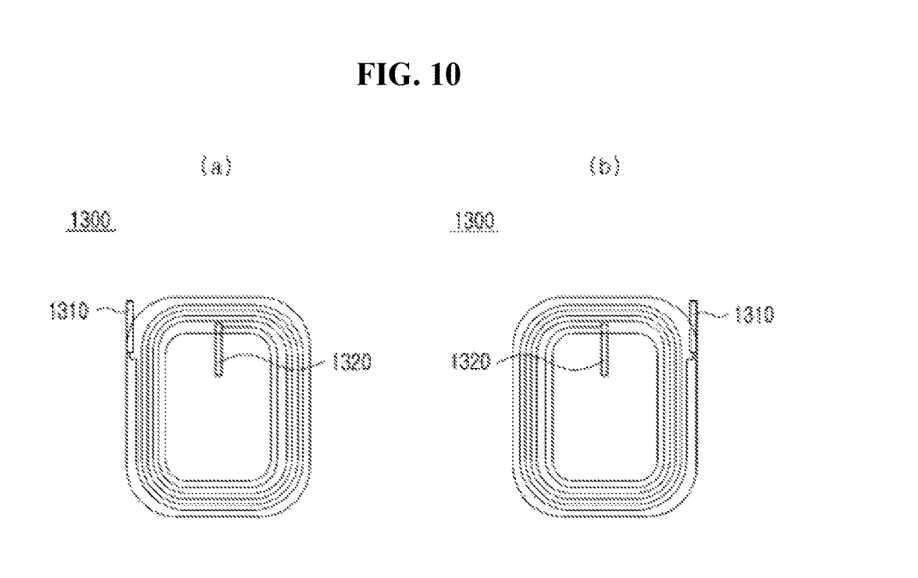
FIG. 10 is a front view and a rear view showing the detailed construction of a wireless power transmission coil constituting the dual mode antenna of FIG. 7.

As previously described, the wireless power transmission coil 1300 may be formed on a third insulative sheet different from the first and second insulative sheets. In this case, the wireless power transmission coil 1300 may be formed at opposite main surfaces of the third insulative sheet in an overlapping fashion.

Also, the wireless power transmission coil 1300 may be formed of a real coil made of a material exhibiting high conductivity. In this case, both ends 1310 and 1320 of the real coil may be coupled to the joining units 1262 and 1264 by soldering.

In the user device with the above-stated construction according to the embodiment of the present invention, overlap between the NFC antenna and the wireless power transmission antenna is prevented although the NFC antenna and the wireless power transmission antenna are provided in a limited space, and therefore, it is possible to prevent lowering in performance of the user device due to mutual interference therebetween.

Various embodiments have been described in the best mode for carrying out the invention.

As is apparent from the above description, an antenna installation space is efficiently disposed in a user device, and therefore, it is possible to simultaneously support near field communication (NFC) and wireless power transmission.

Also, the NFC antenna and the wireless power transmission antenna are disposed in the user device so that the NFC antenna and the wireless power transmission antenna do not overlap, and therefore, it is possible to restrain lowering of communication performance due to mutual interference therebetween. Consequently, the present invention can be widely used in industries related to a flexible printed circuit board for dual mode antennas, a dual mode antenna and a user device using the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dual mode antenna comprising:
    an insulative sheet including a main surface and an opposite main surface;
    a loop-shaped wireless communication coil formed on the main surface of the insulative sheet;
    a wireless power transmission coil formed inside the loop-shaped wireless communication coil to be electrically disconnected from the loop-shaped wireless communication coil, and formed on the main surface of the insulative sheet;
    a pair of wireless communication coil connection terminals electrically connected to both ends of the loop-shaped wireless communication coil, respectively;
    a pair of wireless power transmission coil connection terminals electrically connected to both ends of the wireless power transmission coil, respectively; and
    a ferrite sheet formed to contact the opposite main surface of the insulative sheet,
    wherein the ferrite sheet comprises:
        a first ferrite sheet formed to be in contact with a position opposite to the loop-shaped wireless communication coil on the insulative sheet; and
        a second ferrite sheet formed to be in contact with a position opposite to the wireless power transmission coil on the insulative sheet.

2. The dual mode antenna of claim 1, wherein a distance between the wireless power transmission coil and the loop-shaped wireless communication coil is greater than a distance between element wires forming either each of the wireless power transmission coil or the loop-shaped wireless communication coil.

3. The dual mode antenna of claim 1, wherein one of the pair of wireless communication coil connection terminals is electrically connected to one end of the loop-shaped wireless communication coil via a stitching via, and
    wherein the dual mode antenna further comprises a pair of extension patterns configured to electrically connect the pair of wireless power transmission coil connection terminals to the opposite ends of the wireless power transmission coil.

4. The dual mode antenna of claim 3, wherein the pair of extension patterns are arranged not to overlap with the loop-shaped wireless communication coil.

5. The dual mode antenna of claim 4, wherein the pair of extension patterns are formed on a surface of the insulative sheet which is different from the main surface of the insulative sheet on which the loop-shaped wireless communication coil is formed.

6. The dual mode antenna of claim 5, wherein the stitching via comprises:
- two vias configured to pass through the insulative sheet; and
- a connection pattern configured to electrically connect the two vias to each other.

7. The dual mode antenna of claim 6, wherein the pair of wireless communication coil connection terminals are electrically connected to an external wireless communication module, and
- the pair of wireless power transmission coil connection terminals are electrically connected to a wireless power transmission module.

8. The dual mode antenna of claim 1, wherein one of the pair of wireless communication coil connection terminals is electrically connected to one end of the loop-shaped wireless communication coil via a jumper line, and
- wherein the dual mode antenna further comprises a pair of extension patterns configured to electrically connect the pair of wireless power transmission coil connection terminals to the opposite ends of the wireless power transmission coil.

9. The dual mode antenna of claim 1, wherein a step adjustment slit is formed between the loop-shaped wireless communication coil and the wireless power transmission coil to adjust a step between the first ferrite sheet and the second ferrite sheet.

10. A user device comprising the dual mode antenna of claim 1.

* * * * *